United States Patent Office 3,556,770
Patented Jan. 19, 1971

3,556,770
PROCESS FOR MAKING ALLOYS AND METALS
Carl B. Post, Wyomissing, and Ralph C. Leinbach, Jr., Reading, Pa., and Michael D. Sullivan, Bridgeport, Conn., assignors to Carpenter Technology Corporation, a corporation of Delaware
No Drawing. Filed Oct. 24, 1967, Ser. No. 677,729
Int. Cl. C21c 7/06, 7/10; C22d 7/00
U.S. Cl. 75—10                                                     9 Claims

ABSTRACT OF THE DISCLOSURE

A process for making alloys and metals in which metallic values are charged into an electric arc furnace where they are melted by the heat from the electric arc and by the heat of the exothermic reaction resulting from the injection of gaseous oxygen which also serves to at least partially decarburize the molten metal. The molten bath is removed from the arc furnace and thereafter refined under vacuum during which stage final chemistry adjustments are effected. In the case of products in which the final carbon content is to be below about 0.03%, completion of decarburization as well as refining of the melt is carried out under vacuum after the melt has been removed from the arc furnace.

---

The present invention relates to a process for making alloys which is also suitable for refining certain metals such as nickel and cobalt. More particularly the present invention relates to such a process which is started and carried forward in an electric arc furnace through only those stages of the process for which it is best suited, whereupon the molten metal is removed from the arc furnace and the process is completed under vacuum conditions up to and preferably including teeming and solidification of the metal.

After gaseous oxygen became available years ago in large enough quantities and was sufficiently economical for use in commercial, large scale metallurgical processes such as steelmaking, oxygen injection or blowing as a technique was combined in the arc furnace with its slag reactions to make economically feasible larger and larger furnaces until today arc furnaces capable of handling charges of 100 tons or more are an economic reality. As has been known, the practice of injecting oxygen into the furnace when the charge has only been partially melted provides substantial amounts of heat from the strongly exothermic oxidation of carbon and silicon or other reactive elements in the bath. Such heat reduces to a marked extent the amount of electrical power needed for completing melt-down. With oxygen available in sufficient quantities and at low enough cost, supplementing the heat generated by the arc with additional heat provided by the injection of oxygen can reduce the portion of the charge melted by electrical energy to as low as 50% or even lower.

It has also hitherto been recognized that such alloys as carbon or medium-carbon steels, steels used for large forgings, and bearing steels prepared in the basic arc furnace could be improved in quality by subjecting the molten metal to vacuum before teeming and solidification. In effect this served as a degassing operation and was intended to lower the hydrogen and/or oxygen content of those grades of steel. However, the practice of vacuum degassing steel produced in the basic arc furnace was limited to use in the production of steels on a commercial basis, so far as is known, to those special instances were the added expense could be justified by an increase in quality resulting, for example, from a reduction of the hydrogen or oxygen content of the product.

The present invention stems from our discovery that when a vacuum practice is combined at the proper stage with the arc furnace practice in the making of an alloy or metal so that refining of the melt, as distinguished from the hitherto known practice of an added stage of vacuum degassing, is carried out in the vacuum vessel, then the amount of time required for making a given amount of an alloy can be significantly reduced, the time being measured from the start of melting down the charge in the arc furnace to teeming the metal. From the results achieved with trial production runs of about 40 ton heats, it is apparent that the time required for producing metal by the conventional basic arc furnace practice can be reduced by from about 20% to about 50% in accordance with the present invention.

Even larger economies in equipment and time as well as substantial savings in the cost of the materials used are provided in accordance with the present invention when, for a given alloy the maximum carbon content of the final product is to be less than an extra low value, such as less than 0.03%. Here and throughout this application proportions stated as percents are percent by weight unless otherwise indicated. In the case of such alloys, trial production runs of about 40 ton heats indicate that such alloys can be produced in accordance with the present invention in 60% or less of the time required by conventional basic arc furnace techniques. Having in mind that the time thus saved can be converted into an almost equal amount of metal making capacity, it is apparent that the present invention provides an important improvement in the efficiency of the metal making process as hitherto practiced in the basic arc furnace. Furthermore, not only does the present invention provide important economic advantages in the production of alloys but in addition, the product is cleaner and includes less hydrogen and oxygen and less micro-inclusions.

A principal object of the present invention is, therefore, to provide an improved process for making alloys which is also suitable for refining the metals nickel and cobalt which, though utilizing an arc furnace practice, requires considerably less time and provides an important economic advantage without any sacrifice in the quality of the product or with improved quality as compared to conventional techniques which incorporate the arc furnace in the metal producing process.

Another object is to provide an improved process for making ferrous-base alloys containing one or more of the alloying elements desirably present in such alloys, such as carbon, manganese, silicon, phosphorus, sulfur, chromium, nickel, molybdenum, copper, cobalt, columbium, titanium, vanadium, tungsten, aluminum, boron and others which makes possible the production of such alloys with a marked saving in time and expense as compared to conventional arc furnace melting practices without any significant loss in the quality of the product or with improved quality.

A more specific object is to provide an improved process for making stainless steel alloys identified in the trade as the A.I.S.I. 200 series, 300 series and 400 series grades, either the standard grades in which carbon may range as high as 1% and even higher to the range of 1% to 1.5%, or the low carbon grades in which the carbon content may not range above about 0.15%, or the extra low carbon grades which may not contain more than about 0.03% carbon.

A further important advantage of the process of the present invention resides in the fact that in making many of the metal products that can be made in less time and with equal or improved quality, there is no change required in the customary practice of charging the arc furnace. That is to say, in practicing the present invention, the same starting materials in the same proportions customarily charged into the arc furnace in keeping with the melting shop practice in a given commercial installation for making a specific alloy can also be used in making the same alloy by the process of the present invention. Thus, it is not necessary to develop new or additional materials purchasing and/or handling techniques.

For all practical purposes, it is believed that this holds true for all alloy and metal products produced by the present process except for those chromium bearing alloys containing carbon in amounts less than 0.03%. In the case of the stainless steels which customarily contain chromium in amounts ranging upwards of about 7% in which the required carbon content is less than 0.03% a generally used commercial arc furnace melting practice requires the addition of substantially all of the chromium to the furnace in the form of a relatively expensive ferrochrome alloy, containing no more than about 0.1% carbon, after the initial charge made up essentially of iron (or iron and nickel, when nickel is also to be present) has been carried through the decarburization and reduction stages of the conventional process. The cost of such extra low carbon chrome-bearing alloys adds measurably to the manufacturing cost of the extra low carbon grades of stainless steel. In making such stainless steels according to the present invention, it is not necessary to use such expensive sources of chromium and, in fact, the very same charge components in the same proportions as customarily used in the commercial production of a given standard grade of stainless steel, is also used in the process of the present invention in making the extra low carbon version with a carbon content of 0.03% or less. It is apparent therefore that in addition to providing a substantial reduction in the time required in melting such alloys, the process of the present invention provides substantial saving in the cost of the materials used while at the same time providing a product of equal or better quality than hitherto attainable by the conventional arc furnace practice.

The present invention enhances the efficiency and productivity of commercial arc furnaces by providing a process which is started in the arc furnace and completed outside the furnace by means of a vacuum treating unit. As in the case of the arc furnace, the vacuum unit may be any available device, and should be capable of rapidly reducing the pressure at the metal-atmosphere interface from about 5 mm. Hg down to about 50 microns Hg or even lower. Preferably the arrangement is such as to facilitate the making of additions to the molten metal, particularly for the purpose of effecting final analysis adjustments.

The present invention will now be described in greater detail in connection with the production of stainless steel alloys and illustrative examples of the present process in making several well-known alloys of the A.I.S.I. 300 series and 400 series grades of stainless steels will be described in detail hereinbelow. But it is to be understood that it is not intended thereby to limit the scope of the present invention to the making of such alloys and it is recognized that other ferrous-base alloys as well as nickel and/or cobalt alloys may be made by the process of the present invention.

Those skilled in the art of making stainless alloys in the electric arc furnace very often designate four stages in the over-all process as (1) melt down; (2) decarburization; (3) reduction; and (4) refinement. As was noted above, occasionally a fifth stage is added involving exposing the molten metal to subatmospheric pressure so as to remove or reduce volatizable impurities, such as hydrogen and oxygen.

In making stainless steel alloys in accordance with the present invention, the arc furnace is charged in the customary way hitherto used in making such steel by the basic arc furnace (BAF) practice. Depending upon the shape and size of a particular installation, all or part of a charge may be introduced into the furnace initially. When, as is well known, all of the solid charge, because of its bulk, cannot be introduced at the outset, the electrical power is turned on with that part of the charge that can be accommodated, and as soon as practical the furnace is recharged, that is, the remainder of the charge is introduced. When melting has progressed sufficiently under electric power to permit introduction of the oxygen lance equipment, the electric power is turned off and melting down of the charge is completed by injecting oxygen.

It may be noted here that in keeping with the usual practice when the injection of gaseous oxygen is utilized to complete melting down of the charge and also decarburization, to attain a predetermined analysis in the final product, the initial charge may contain all or part of the elements which are not so reactive with oxygen or so relatively volatazable at the temperature of the melting process that appreciable amounts would not be recovered in the final analysis at all or only with difficulty and excessive cost. Such relatively unreactive elements include iron, chromium, nickel, molybdenum, cobalt, tungsten and copper. Other desired constituents of the final product which are relatively reactive with oxygen to form oxides which may escape entirely or may be lost to the slag from which they can be recovered only with difficulty, are usually added to the melt during the refining period. One or more elements which undergo a highly exothermic reaction with the injected gaseous oxygen, for example, carbon, silicon, aluminum and titanium, is desirably present in the molten metal bath to function as fuel and reduce the amount of electrical power required in carrying out the melting process. Thus one or more of such elements is included in the charge, whether or not desired as an alloying constituent in the final product.

The rate and duration of the oxygen blow may be varied but sufficient gaseous oxygen is injected to provide the heat necessary to complete melt down and, in the case of products which can contain more than about 0.03% carbon, the carbon-oxygen reaction $$[C + \tfrac{1}{2} O_2 = CO + \text{Heat}]$$

is carried to the point where the carbon content is desirably below the maximum amount of carbon tolerable in the final product. On the other hand, when the alloy being produced is to contain less than 0.03% carbon, then the carbon-oxygen reaction is carried to the point where the amount of oxygen in solution in the molten metal (determined by the composition and temperature of the metal) is enough to react with the carbon remaining in the metal, when the latter is subjected to subatmospheric pressure; to provide a final product in which the carbon content is less than 0.03%.

The theoretical quantity of oxygen required can be readily calculated from the weight of the charge and the proportion thereof formed by those elements which react exothermically with the oxygen to provide the required amount of heat. In practice, the actual amount of oxygen to be injected will be somewhat larger than the theoretical value, depending upon the thermal efficiency or characteristics of the furnace, the charge and the manner in which the oxygen is injected.

The electrical arc furnace of the type which has been used in carrying out commercial BAF furnace melting practice and having the electrodes mounted in its removable furnace roof provides relatively good thermal efficiency. Such furnaces are also constructed with one or more doors which facilitates injection of the gaseous oxygen early during melting, thereby minimizing the extent to which electrical power must be used.

The reaction of oxygen with the relatively reactive elements, such as carbon, silicon, aluminum, titanium, and also its reaction with chromium, as well as the amount of heat produced when the elements react in stoichiometric proportions is known, having been established in connection with prior metallurgical processes including the BAF furnace practice hitherto used in which gaseous oxygen was injected for decarburization. For example, in the case of carbon and chromium, it is known that their relative rates of oxidation depend upon the proportions in which they are present and the temperature of the molten metal. Furthermore, it is also known that at higher temperatures carbon is preferentially oxidized, while at lower temperatures the chromium is preferentially oxidized, that when decarburizing stainless steel by the oxygen blowing method in the BAF furnace practice, the temperature required to reach a given carbon level, e.g., 0.08% maximum, with a minimum loss of chromium, depends upon the chromium content, and that a higher temperature is required with larger chromium contents. Having in mind that for economic reasons as much as possible of the chromium (as well as such other elements as nickel) should be introduced in their cheapest available form that can be practically used, that is, in the form of charge chrome or scrap which may contain appreciable amounts of carbon, it is apparent from the foregoing considerations that the rate of oxygen injection into the molten metal should be such as to rapidly raise the bath to the temperature which best favors the decarburization reaction, while at the same time minimizing the amount of chromium which is oxidized. This last has the further advantage of requiring less reducing agent and volume of slag in the subsequent reduction stage with a further resultant gain by reason of less chromium being lost to the slag as a result of mass effects. In short, the objectives of conservation of time, as well as materials, are attained by the use of an oxygen input rate which is at or close to the maximum that the size of the bath will permit.

Completion of decarburization is followed by a reduction stage in which metal values which were oxidized are recovered by means of a reducing agent such as a ferro-silicon alloy or, when chromium is a constituent element of the product, a ferro-chrome-silicon alloy. The carbon content of such reducing agents is selected so as to be consistent with good economic practice but yet low enough so as not to create difficulties in attaining the desired maximum carbon in the final analysis. When rapid cooling is desired after the high temperature decarburization, controlled additions of revert scrap may also be made to the arc furnace at this time. By "revert" scrap is meant scrap generated incidental to normal steelmaking operations, such as cropping from ingots, blooms and billets, etc. Usually the electric arc is used to fuse the mixture of reducing agent and lime as well as the high refractory slag developed during the decarburization stage. As is well known, the metal and slag in the furnace is agitated in a suitable way, usually by reladling or rabbling to facilitate the reduction reactions.

When the final analysis of the product is to contain about 0.03% carbon or more, the molten metal preferably with the slag formed during reduction, is tapped and refining of the melt is carried out under vacuum to reduce to a tolerable level the oxygen content and, if necessary, the sulfur content may also be reduced either before or after the vacuum treatment. Furthermore, such additions as may be necessary to effect final chemistry adjustments are also carried out during the refining stage.

As was noted herein above, any available vacuum equipment can be used capable of handling the quantity of metal to be treated at the required pressure level. It is desirable that the equipment be capable of rapidly reaching vacuum levels as low as 50 microns Hg or below and of maintaining the desired low pressure during the treatment of the molten metal. When no provision is available for maintaining the temperature of the molten metal while it is being vacuum treated so that it will be at the proper teeming temperature on completion of this stage, it is desirable to ensure that the temperature of the metal when it is tapped from the furnace is high enough above the desired teeming temperature so that any drop in temperature that will take place during the vacuum treatment will not result in carrying the temperature of the metal below the desired teeming temperature. In practice, some of the temperature drop that occurs in such vacuum equipment may be compensated for by the heat of solution of certain additions that may be made in adjusting the analysis of the metal. On the other hand when the vacuum equipment is equipped with heating means for controlling the temperature of the metal during the vacuum treatment, the temperature of the metal when it is tapped from the arc furnace need not appreciably differ from normal tapping temperatures hitherto utilized.

The advantages of the present process will be better appreciated when it is understood that in the conventional BAF furnace practice in which refining of the molten metal to reduce the oxygen content to a tolerable level is carried out in the arc furnace, the refining stage may take as long as 1 to 1½ hours or more. In the case of stainless steel alloys the tolerable oxygen level usually varies from about 200 parts per million (p.p.m.) down to about 40 p.p.m. These requirements may vary with individual products. For example, in some instances a lower level may be desired, e.g. about 20 p.p.m.

The benefits of the present process are largely obtained by removing the molten metal from the arc furnace as early as possible in the melting process, to the vacuum treating equipment so as to take advantage of the much more efficient removal of oxygen that can be thus provided. These purposes are best achieved by transferring the molten metal to the vacuum treating equipment just before or as soon after the start of the reduction stage as practical. In practice, this can be accomplished by tapping the metal from the arc furnace as soon as the reduction mix has been fused. However, when the heat required to fuse the reduction mixture is available from the molten metal itself and the ensuing reduction reactions which begin as the reduction mixture is being added to the molten metal, then the charge can be tapped before the addition of the reduction mixture and immediately after decarburization, thus further reducing the amount of time it is required to use the arc furnace for a given heat.

There may be instances when it may be desirable to apply and fuse a refining slag in the arc furnace as, for example, when the maximum tolerable sulfur content in the final product cannot otherwise be attained. This modified practice would delay tapping the heat from the furnace for long enough to remove the reduction slag and to add and fuse the refining slag, which usually takes about 15–45 minutes. Nevertheless the time required in melting such heats, measured from power on in the arc furnace to teeming of the metal with the required low level of oxygen, affords a saving of approximately 20% or more of the time required to achieve equivalent results with conventional BAF furnace air melting practices which incorporate a fifth degassing stage to achieve equivalent oxygen levels.

When consideration must be given to reducing the sulfur content of the metal during the refining stage, then better results are achieved in accordance with the present invention when a synthetic slag is used. In keeping with this practice the synthetic slag is added after the metal has been tapped from the arc furnace. In accordance with one modification of the process a reladling practice is utilized during which the reduction slag is decanted and the synthetic slag is added while the metal is poured from one ladle to another. Usually desulfurization is completed by tapping both the synthetic refining slag and the metal back into the original ladle so as to provide the maximum intermingling and slag-metal interface.

In accordance with a further and preferred modification of this practice involving the use of a synthetic refining slag, vacuum refining is carried out as was previously described without the addition of any refining slag until the oxygen level in the metal is reduced to the desired low level or end-point, whereupon, if the preliminary sulfur analysis of the metal indicates a need for a further reduction in the sulfur content, the reladling practice as was just described in connection with the previous modification, is then carried out to intermix a synthetic refining slag with the melt so as to reduce the sulfur content to the desired level.

When the final analysis of the product is to contain less than 0.03% carbon, the process in accordance with the present invention proceeds as was previously described in connection with products containing the larger amounts of carbon until the completion of the reduction stage in the arc furnace. It may be well to note here again that an important advantage of the present process resides in the fact that when chromium is to be included in the product, substantially all of the chromium to be present in the final product is included in the initial charge that is melted in the arc furnace before partial decarburization of the melt. During the reduction stage, the heat may be stirred as by reladling or as desired. Upon completion of the reduction stage the slag is removed in the usual way from the arc furnace. Of course, if the heat was reladled, deslagging would usually be accomplished at the same time and the heat is then returned to the furnace. A refining slag may then be added to the heat, as for example, to reduce the sulfur content, if that should be desired.

Before carrying out the second stage of gaseous oxygen injection, a preliminary chemical analysis of the molten metal is made to determine its carbon and silicon content. If in carrying out the process, a refining slag were used following reduction, then the determination of the carbon and silicon content of the molten metal is best made after the addition of the refining slag as is also the measurement of the temperature of the metal. The quantity of gaseous oxygen required to be injected into the bath is determined by the carbon and silicon content of the bath and its temperature.

In this process the final decarburization is carried out by means of the carbon-oxygen reaction which requires that there be available in the molten metal at least an amount of oxygen that will combine stoichiometrically with an amount of carbon equal to the difference between the amount of carbon present in the bath and the extra low level of carbon desired in the final product. As is known, the amount of oxygen that can be held in solution in the molten metal depends upon its composition and temperature. When the temperature of the bath and its composition before the second stage of oxygen injection is such that the temperature must be raised, then during the second oxygen injection stage a sufficient amount of oxygen is injected which, on oxidizing silicon in the molten metal, will provide the required amount of heat to raise the temperature of the metal needed for the carbon-oxygen reaction to proceed to the desired end-point.

If the amount of silicon in the bath is insufficient to combine with the oxygen to give the required quantity of heat then additional silicon is added before commencing the second gaseous oxygen stage.

Even in the case of those products containing substantial amounts of chromium, the amount of silicon in the molten metal just before the second oxygen blow is adjusted to such a level that upon completion of the second stage of oxygen injection the silicon, which would then be primarily in the form of liquid silicon, is present in an amount no less than about 0.1% and may range up to about 0.25% or higher depending upon the temperature of the metal. In practice, sufficient oxygen should be present in the melt at a tolerable temperature to eliminate a sufficient amount of carbon to reach the desired carbon level below 0.03%. As is known, the temperature of the metal at which the required amount of oxygen can be present in the molten metal in the presence of silicon, rises with increasing silicon content so that with silicon contents above about 0.25% the temperature is soon reached at which the refractories are objectionably affected, so that with silicon contents above about 0.25% it is necessary to provide refractories capable of withstanding exposure to the molten metal at such higher temperatures for a time long enough to carry out the required treatment.

When chromium is present in the molten metal it is particularly undesirable to reduce the silicon content below about 0.1% because this results in an excessive amount of chromium being oxidized and lost to the slag during the second gaseous oxygen stage. Unlike the first oxygen injection stage which is followed by reduction during which chromium values would be recovered from the slag, such values as may be lost to the slag during the second blow are desirably kept low or within tolerable limits.

Upon completion of the second stage of gaseous oxygen injection, the heat is tapped from the furnace. Usually a further preliminary chemical analysis of the tapped heat is now made so that such final chemistry adjustments as may be required can be carried out during the vacuum treatment stage. After removal from the furnace the heat is subjected to treatment in the vacuum equipment at a low enough pressure for the necessary time required to permit the oxygen in the melt to react with the carbon that is eliminated during this stage. Upon completion of vacuum treatment the heat may be teemed as desired.

In carrying out the following illustrative examples, the electric arc furnace utilized was a commercially available 44-ton top charge basic electric arc furnace. The diameter of the unit was approximately 15 feet and the unit was equipped with front and side doors about 90° apart. The unit was powered by a 12,500 kva. transformer. Gaseous oxygen injection was carried out in each system simultaneously through both doors of the furnace with an oxygen lance having a 1-inch internal diameter connected to a source of gaseous oxygen at a pressure ranging from 150–175 lbs. per sq. in. and a delivery capability of 100,000 to 125,000 standard cu. ft. per hr. The vacuum treatment equipment utilized was a commercially available Dortmund-Horder (D-H) vessel equipped with a suitable number of hoppers through which additions such as those required for final analysis adjustment can be made into the vacuum vessel.

The ladles utilized in tapping the arc furnace and in the vacuum degassing treatment were standard pouring ladles capable of holding a heat of about 90,000 lbs.

The process of the present invention will now be described in connection with the melting of a heat of A.I.S.I. 416 stainless steel alloy having the usual analysis of 0.15% maximum carbon, 1.25% maximum manganese, no more than 0.06% phosphorus, a minimum of 0.15% sulfur, no more than 1.00% silicon, 12.00 to 14.00% chromium, and the balance iron except for incidental impurities.

EXAMPLE I

An initial charge of 79,300 lbs. was prepared for heat No. 817,517 made up of scrap and charge chromium customarily utilized in the making of this type of alloy by the conventional BAF furnace air melting practice. The charge was made up of about 13.25% chromium and it also contained about 330 lbs. of carbon and incidental silicon. As much of this material was charged into the furnace as could be handled, the roof was closed, and the power was turned on. As soon as melting had progressed far enough to accommodate the remainder of the charge, the furnace was recharged. Approximately an hour and 25 minutes after the power had been turned on, the power was turned off and oxygen lances were introduced through both the front and side doors of the furnace. Gaseous oxygen was injected for 17 minutes through both lances at a rate such that a total of 35,000 standard cu. ft. of gaseous oxygen was blown into the melt.

After completion of the oxygen blow the reduction of the bath was started by adding a reducing mixture made up of 3,500 lbs. ferro-chrome-silicon (0.05% C max., 40% Cr, 43% Si, and the balance Fe—hereinafter identified as 40/43 FeCrSi), 2,200 lbs. lime, 300 lbs. of fluorspar, and 6,000 lbs. of type 416 revert scrap for cooling purposes. After the charging of this reduction mixture the roof was closed and the power was turned on again. During reduction, 400 lbs. of crushed 75% ferro-silicon (75% Si and the balance Fe) was added as a slag dressing.

Upon completion of reduction a small amount of the slag was removed to ensure against spillage and the heat was tapped into a ladle. The furnace was tapped 1 hour and 58 minutes after the power had been initially turned on and a total of 14,200 kwh. of electrical power was used. During the tap, 240 lbs. of sulfur was added to the ladle. Following completion of the tap, the ladle was positioned beneath the D-H vacuum vessel and refining of the heat then proceeded.

After the vacuum treatment had progressed far enough to carry the oxygen content down to the desired level, the final finishing additions were made of 265 lbs. of electrolitic manganese, 200 lbs. of 9% C-Fe-Cr (9% C, 70% Cr, and the balance Fe), and 600 lbs. of 0.05% maximum C-Fe-Cr (containing 70% Cr and the balance Fe). The heat was then teemed about 40 minutes after it had been tapped into the ladle. The total elapsed time from initial power on to the teeming of the melt was 2 hours and 38 minutes. Fifteen ingots were cast weighing about 5,400 lbs. with the total recovered weight of metal being 81,000 lbs.

For comparison with Example I, the following data was obtained from melting heat No. 817,505 of A.I.S.I. type 416 in the same furnace that was used in making heat No. 817,517 of Example I. Heat No. 817,505 was made by the customary air melting practice in the BAF furnace. The charge of 787,720 lbs. was made up of the same type of material used as the charge for heat No. 817,517 and contained 13.25% chromium, about 350 lbs. carbon and incidental silicon. After as much of the charge as could be accommodated had been placed in the furnace, the roof was closed and the power was turned on. The furnace was recharged in the usual way as soon as the remainder of the charge could be accommodated. After melting down had proceeded for 1 hour and 24 minutes, the electrical power was turned off. Gaseous oxygen was then injected by means of the same type of oxygen lance equipment as used in Example I, through the front and side doors of the furnace for 24 and 26 minutes, respectively, at a rate such that about 41,250 standard cubic feet of gaseous oxygen was blown into the melt.

After completion of the oxygen blow, reduction was started by adding a reducing mixture made up of 3,500 lbs. 40/43 Fe-Cr-Si, 2,200 lbs. lime, 300 lbs. fluorspar, and 6,000 lbs. type 416 revert scrap, the latter being added at this time for cooling purposes as before.

After the charging of this reduction mixture, the furnace was closed and the power was again turned on. During reduction, 400 lbs. of crushed 75% ferro-silicon were added as slag dressing. Upon completion of reduction the bath was deslagged and stirred, whereupon a sample was taken for preliminary analysis. A refining slag mixture of 1,600 lbs. lime and 450 lbs. fluorspar was added and the bath was rabbled. The temperature of the bath was then measured and found to be 3050° F. After refining had continued sufficiently long, the composition of the bath was analyzed, and the final finishing additions were made of 1,950 lbs. of 0.50% max. C-Fe-Cr, 200 lbs. of 6% C-Fe-Cr (6% C, 70% Cr, and the balance Fe), 530 lbs. of 50% Fe-Si, and 460 lbs. of Fe-Mn-Si (0.05% max. C, 60% Mn, 30% Si and the balance Fe), and the bath was rabbled. The temperature of the bath was measured and then tapped at about 2,910° F. into a ladle. Whereupon 230 lbs. of sulfur was added and the heat was then teemed.

The melting time from initial power on to tapping was 3 hours and 23 minutes and 15,600 kwh. of electrical power were consumed. Sixteen ingots were cast, one of which weighed 4,400 lbs. and the remainder 5,400 lbs., with a total recovered cast weight for the heat of 85,400 lbs.

The final composition of heats No. 817,517 and No. 817,505 was as follows:

|  | 817,517 | 817,505 |
| --- | --- | --- |
| Carbon, percent | 0.10 | 0.09 |
| Manganese, percent | 0.50 | 0.45 |
| Silicon, percent | 0.70 | 0.53 |
| Phosphorus, percent | 0.019 | 0.018 |
| Sulfur, percent | 0.35 | 0.29 |
| Chromium, percent | 13.10 | 13.06 |

For both heats the balance was iron except for incidental impurities.

The oxygen level of heat No. 817,517 of Example I was determined by the same analytical technique that had been used for determining oxygen in 28 previously made commercial heats of about 40 tons of air melted type 416 and it was found to be about 12 p.p.m. lower than the average, a difference which is believed to be smaller than the experimental error and therefore insignificant. Heat No. 817,506 was also so analyzed and was found to contain about 9 p.p.m. more than that average.

On comparing the composition of heat No. 817,517 with that of heat No. 817,505 it is seen that they are substantially equivalent for practical purposes. However it is also seen from the production data that only 1 hour and 58 minutes of furnace time and an overall production time of 2 hours and 38 minutes was needed for heat No. 817,517, while 3 hours and 23 minutes of furnace time and overall production time was used in making heat No. 817,505. Thus, the overall time to produce about 40 tons of type 416 stainless was reduced by about 22% when made in accordance with the present invention as was described. But, what is most important is that the arc furnace time required was reduced by about 42%.

To illustrate further the present invention, production of about a 40 ton heat of A.I.S.I. Type 304L stainless steel alloy having the usual analysis of 0.030% max. carbon, 2.00% max. manganese, 0.045% max. phosphorus, 0.030% max. sulfur, 1.00% max. silicon, 18 to 20% chromium, 8 to 12% nickel, balance iron except for incidental impurities, will now be described.

EXAMPLE II

An initial charge of 78,300 lbs. was prepared for heat No. 809,908 made up of scrap and charge chromium customarily utilized in the making of this type of alloy by the conventional BAF furnace air melting practice. The charge was made up of about 18% chromium, about 10.6% nickel, about 400 lbs. carbon, and silicon in amounts incidental to the types of scrap usually used. As much of this material was charged into the furnace as could be handled, the roof was closed and the power was turned on. As soon as practical, the furnace was recharged with the remainder of the charge. Approximately an hour and 19 minutes after the power had been turned on, it was turned off and the 2 oxygen lances were introduced through the front and side doors of the furnace. A 30-minute blow was carried out through each lance at a rate such that a total of about 48,100 standard cubic feet of gaseous oxygen was injected into the melt.

After completion of the oxygen blow, reduction was started by adding a reducing mixture made up of 2,200 lbs. lime, 300 lbs. fluorspar, 5,000 lbs. 40/43 Fe-Cr-Si and 2,500 lbs. A.I.S.I. type 304 revert scrap for cooling purposes. After charging this reduction mixture, the roof was closed and the power was turned on again. During reduction, 200 lbs. of crushed 75% ferro-silicon were added as a slag dressing. The heat was also reladled, during the course of which some slag was decanted and an additional 1,000 lbs. of type 304 revert scrap were added for further cooling. The heat was returned to the furnace and two samples were taken for chemical analysis, which gave the first preliminary composition as 0.054% carbon, 0.19% manganese, 0.017% phosphorus, 0.66% silicon, 0.025% sulfur, 17.30% chromium, 10.54% nickel, and the balance iron except for incidental impurities.

Following return of the heat to the furnace a refining mixture was added made up of 1,600 lbs. lime and 450 lbs. fluorspar, whereupon the temperature of the bath was measured and found to be 2900° F. A second preliminary chemical analysis was made of the bath and it was found that the manganese content had changed to about 0.22%, the silicon content to about 0.55%, and the sulfur content to about 0.021%. In view of the acceptable level of the sulfur content, it was not necessary to change the slag to avoid any possibility of sulfur reversion during the second stage of gaseous oxygen injection.

Because the chromium content of the bath was about 17.30%, 2,000 lbs. of 0.05% max. C-Fe-Cr (70% Cr) were added to adjust the chromium content upward to 18.30% in anticipation of the small amount of chromium that could be expected to be oxidized during the second oxygen blow.

From the determination of the carbon content in the bath of 0.054% and the silicon content of 0.55%, and having in mind the 2900° F. temperature of the bath as well as the anticipated temperature drop to be expected during transfer of the heat in the ladle from the furnace to the vacuum equipment, it was readily determined that upon completion of the oxygen blow the temperature of the bath was required to be no less than 3200° F. and that to attain that temperature no additional silicon was needed to be added to the bath. The tap temperature of above 3200° F. insured that with the equipment used, the molten metal at the start of the vacuum treatment would have a temperature of about 3100° F. to provide a sufficient amount of oxygen available to eliminate the quantity of carbon to be removed to reach the desired final carbon level of below 0.03%. Based upon these factors, the second oxygen blow was carried out in the same manner as the first oxygen blow, but this time for seven minutes through each door of the furnace so as to inject 10,600 standard cubic feet into the molten metal.

Upon completion of the oxygen blow the temperature of the bath was measured and it was found to be off scale (above) on a meter capable of reading to 3200° F. The heat was then tapped into a ladle in which 2,000 lbs. of type 410 revert scrap had been placed to protect the bottom of the ladle.

The heat was then carried to the D–H vacuum treating equipment and at the same time the necessary samples were removed from the heat for analysis so as to determine the necessary finishing adjustments to be made during the vacuum treatment. That analysis of the heat showed that it contained about 0.065% carbon, 0.16% manganese, 0.15% silicon, 17.70% chromium, 10.22% nickel, and the balance iron except for incidental impurities. With the ladle positioned beneath the D–H vacuum vessel and ready for the first cycle or stroke, the temperature of the heat was measured and found to be 3100° F. Completion of the carbon-oxygen reaction required 38 strokes and then final chemistry adjustments were carried out by adding to the melt in the vacuum vessel 960 lbs. of electrolytic manganese, 260 lbs. silicon metal (containing a minimumm of 98% silicon) and 1800 lbs. 0.014% max. C-Fe-Cr (70% Cr). The vacuum treatment was completed in 61 strokes at which time the temperature of the molten metal was measured and found to be 2900° F. The heat was teemed about 28 minutes after tap, to cast fourteen ingots, each weighing about 5400 lbs., with the total recovered weight of metal being 75,600 lbs. The furnace time from initial power on to tap was 3 hours and 12 minutes and 13,600 kwh. of electric power was used. Vacuum treatment took about 20 minutes, and the overall time to make the heat from initial power on to teeming of the melt was 3 hours and 40 minutes.

For comparison with Example II, the following data was obtained for melting heat No. 809,068 of A.I.S.I. type 304L in the same furnace that was used in making heat No. 809,908 of Example II. Heat No. 809,068 was made by the conventional "virgin" air melting practice in the BAF furnace. The charge of 60,760 lbs. was made up of the same type of material customarily used in melting an extra low carbon grade alloy of this type and contained only a negligible amount of chromium, less than 1.0% chromium, about 13.9% nickel, 400 lbs. carbon, and incidental amounts of silicon. After as much of the charge as could be accommodated had been placed in the furnace, the roof was closed and the power was turned on. The furnace was recharged as soon as the remainder of the charge could be accommodated. Then 1500 lbs. lime, 500 lbs. fluorspar and 1000 lbs. iron ore were added. As soon as melting down had progressed far enough to permit, a first preliminary analysis of the composition of the bath was made as is customary, and it was found to contain about 0.39% carbon, 0.16% manganese, nil silicon, 0.23% chromium, 0.006% phosphorus, 0.020% sulfur and except for nickel and incidental impurities, the balance was iron.

About two hours from the start up, the power was turned off and oxygen was injected for 8 minutes through the side door of the furnace at a rate such that 4800 standard cubic feet of gaseous oxygen were injected into the melt. As is customary in the oxygen blow technique of decarburizing, the duration of such a blow to reduce the carbon content of the bath to about 0.1% is readily determined by observing the flame drop which occurs substantially coincident with when the carbon content drops to a level of 0.1%.

A sample for chemical analysis was removed from the bath and gaseous oxygen injection continued through the two oxygen lances, through the one in the front door for 10 minutes, and through the one positioned in the side door for 12 minutes, the rate being such that an additional 17,700 standard cubic feet of gaseous oxygen were injected into the melt. Upon completion of the oxygen blow a reducing mixture of 700 lbs. ferro-silicon (50% Si) were added to the melt in the furnace and the power was turned on. During reduction 700 lbs. of crushed 75% ferro-silicon were added to the melt. After the reduction mixture was fused a portion of the slag was removed and 320 lbs. of lime were added to start refining the melt. A sample was removed for preliminary analysis determination and then 500 lbs. of 75% Fe-Si were added followed by 3000 lbs. of 0.010% max. carbon Fe-Cr (70% Cr) and 240 lbs. lime. After rabbling of the bath, a further addition of 9000 lbs. of 0.010% max. carbon Fe-Cr was made together with 240 lbs. of lime. As soon as melting of that additional material had proceeded far enough, another addition of 3000 lbs. of 0.010% max. carbon Fe-Cr and 160 lbs. lime was made. Further slag dressings were made with 160 lbs. lime and 100 lbs. crushed 75% Fe-Si. The bath was well stirred and, based upon a chemistry analysis, the analysis of the heat was further adjusted by the addition of 7400 lbs. of 0.010% max. carbon Fe-Cr (70% Cr), 1150 lbs. electrolytic manganese, and 400 lbs. 85% Fe-Si (85% Si). The slag was dressed and the temperature of the molten metal was adjusted to provide the desired tapping temperature and then the heat was tapped and teemed. Fourteen ingots were cast weighing about 5400 lbs. and providing a total recovered cast weight for the heat of 75,600 lbs.

The melting time from initial power on to tapping for heat No. 809,068 was 5 hours and 37 minutes, and 24,800 kwh. of electrical power were consumed.

The final composition of heats No. 809,908 and No. 809,068 was as follows:

|  | 809,908 | 809,068 |
|---|---|---|
| Carbon, percent | 0.025 | 0.021 |
| Manganese, percent | 1.10 | 1.21 |
| Silicon, percent | 0.44 | 0.68 |
| Phosphorus, percent | 0.018 | 0.013 |
| Sulfur, percent | 0.024 | 0.024 |
| Chromium, percent | 18.30 | 18.01 |
| Nickel, percent | 9.98 | 10.50 |

For both heats the balance was iron except for incidental impurities.

On comparing the carbon levels of these two commercial-scale production heats of extra low carbon 18–8 stainless steel, it is apparent that they are substantially equivalent. On the other hand, only 3 hours and 12 minutes of furnace time was needed in producing heat No. 809,908 as against 5 hours and 37 minutes furnace time used in producing heat No. 809,068, a saving of about 43% in furnace time. The overall production time for heat No. 809,908 was 3 hours and 40 minutes (from initial power on to start of teeming), while the corresponding time for heat No. 809,068 was 5 hours and 37 minutes (from initial power on to tap). Thus, the overall time to produce about 35 tons of A.I.S.I. type 304L stainless was also reduced by a significant amount, about 35%. In addition to this saving in time, there was also a substantial saving in cost resulting from the fact that in accordance with the present invention no substantial additions of the more expensive chromium alloying compositions containing 0.05% carbon or less are made. On the other hand, in the process hitherto used, of which heat No. 908,068 is illustrative, almost all of the chromium is introduced in the form of the more expensive chromium bearing alloys containing 0.05% carbon or less.

In carrying out the modification of this process according to which a second oxygen blow is carried out to condition the molten metal in the furnace so that when it is thereafter removed from the furnace and subjected to subatmospheric pressure, excess carbon is removed to reduce the carbon content to below 0.03%, it has been found that good results are achieved when the decarburization effected by the first oxygen blow provides a carbon content range from about 0.03% to 0.08%. As was pointed out hereinabove, the silicon content before the second oxygen blow should be such that upon completion of the second oxygen blow the silicon content is no less than about 0.1% and may range up to about 0.15% or higher depending upon the temperature of the metal. The preferred end point for the silicon content upon completion of the second oxygen blow extends from about 0.12% to 0.15%. With the aforementioned intermediate carbon range of about 0.03% to about 0.08% and the temperature of the molten metal usually encountered in normal commercial practice just before the second oxygen blow the intermediate silicon content may range from about 0.15% to about 1.00%.

When practicing the process of the present invention to attain a final carbon content of less than 0.03%, there may be occurrences when the composition of the molten metal and its temperature will be such that a second stage of oxygen injection prior to vacuum treatment would not be necessary. For example, in the case of A.I.S.I. type 304L this would be the case when following the reduction stage, the temperature of the molten metal is above 3200° F., the carbon content is from about 0.05 to 0.06%, and the silicon content is from about 0.12 to 0.15%.

While the process of this invention is especially well suited for use in the manufacture of the stainless alloys and the stainless steel alloys, in which chromium may range from about 7 to 40%; the process may also be used in making widely different alloys, whereby to reduce the amount of time an electric arc furnace would be used in making the same.

One example of this A.I.S.I. type W1 tool steel containing about 1.05% carbon, 0.20% manganese, 0.20% silicon and the balance iron except for incidental impurities. A charge could be made up for a heat of the W1 tool steel using scrap conventionally utilized in making this type alloy. The weight of the charge would depend upon the capacity of the electric arc furnace used and it would be charged into the furnace in the usual way. With the recharge a suitable amount of lime and fluorspar could be added to provide the desired slag.

The amount of carbon in the charge should provide an excess over the amount desired to remain after decarburization so that the excess, on reacting with oxygen provided by the oxygen blow, will produce the heat needed to complete melting down the charge, with the resulting melt at a temperature of at least 3000° F.

As soon as melting down under the electric arc has progressed far enough to permit, the power is turned off and gaseous oxygen is blown in at a rate and for a time such that melting down of the charge is completed as rapidly as possible.

Since this alloy is to contain about 1.05% carbon, oxygen injection is not continued until flame drop which signals a carbon content in the molten metal of about 0.1%. Instead, the quantity of oxygen to be injected during melt down is calculated in advance based upon the amount of heat needed to be generated by the carbon-oxygen reaction to complete melting down of the charge and provide a high enough temperature of the molten metal, preferably at least 3000° F., to carry it through refining and finishing adjustments to the analysis carried out in the vacuum vessel, and subsequent desulfurization if that should be necessary. The amount of carbon included in the charge is desirably in excess of the amount desired in the final analysis so that upon completion of the oxygen blow the carbon content will be at a suitable level below that wanted in the final composition. For example, in making up a charge of about 40 tons to be melted in the type of electric arc furnace described hereinabove and used in carrying out Examples I and II, carbon may be about 1.5% of the charge.

The furnace is tapped into a ladle together with as much of the slag as may be accommodated, and refining of the heat is then carried out under the D–H vacuum vessel. The subatmospheric pressure to which the metal is subjected during the vacuum treatment permits the carbon-oxygen reaction to resume with the resulting CO being removed by the vacuum equipment. Upon completion of this stage of the vacuum treatment finishing additions of carbon and silicon are made into the molten metal in the vacuum vessel.

The quantity of carbon and silicon to be added could be readily calculated from the percent composition of the molten metal indicated by preliminary analysis which could be made at the time the heat was tapped. After the ladle is removed from the vacuum equipment, a synthetic slag may be used to reduce the sulfur content of the molten metal if the preliminary analysis indicated an excess amount of sulfur over that wanted in the final analysis. The molten metal would then be teemed in the customary manner.

It is contemplated that the present process, either the modifications thereof described hereinabove or others which will be readily apparent to those skilled in the art, could be used in producing a wide variety of alloys as well as metals. In general, it is contemplated that the present process will provide a significant improvement in the manufacture of stainless steel alloys of the A.I.S.I. type 200 series, 300 series, and 400 series grades in which chromium may range from about 7% up to 40%, carbon may range up to 1.20% and varying amounts of other alloying elements may also be included, such as the elements Mn, Si, P, S, Ni, Mo, Cu, Co, Cb, Ti, W, V, B, and Al. It is also contemplated that stainless alloys may also be produced by this process. In such alloys, which include the alloys intended for use under stress at high temperature, chromium is present in an amount that may range from about 9 to 30%, nickel may range up to about 80%, carbon may range up to about 0.20% and other alloying elements may be present in varying amounts. And it is also contemplated that the present process can also be used to advantage to produce alloys containing larger amounts of carbon than contained in stainless grades, such as the tool steels which may contain up to about 2.5%, or even more, carbon.

The terms and expressions which have been employed are used as terms of description and not of limitation, and there is no intention, in the use of such terms and expressions, of excluding any equivalents of the features described or portions thereof, but it is recognized that various modifications are possible within the scope of the invention claimed.

What is claimed is:

1. A method of producing alloys and metals, comprising partially melting a charge in an electric arc furnace by heat generated by the electric arc, then turning off the electrical power and forcefully injecting gaseous oxygen into the partially molten metal bath in the furnace to complete melting down and at least partially decarburize the molten metal, forming a slag, removing the molten metal from the furnace, thereby substantally reducing the duration of the melt in the said electric arc furnace by an amount of time normally required to refine the same then subjecting the molten metal to subatmospheric pressure to refine the molten metal, while the molten metal is under subatmospheric pressure adjusting its composition, and then teeming the metal.

2. The method as set forth in claim 1 in which, before the molten metal is removed from the furnace, at least one reducing agent is added to the slag.

3. The method as set forth in claim 2 in which the molten metal, together with the reducing slag are removed from the furnace and then subjected to subatmospheric pressure.

4. The method as set forth in claim 2 which, following the addition of said reducing agent and before removing the molten metal from the furnace, the amount of carbon and silicon in the molten metal and the temperature of the molten metal being determined, includes adjusting the silicon content to the extent necessary to provide a silicon content of no less than about 0.1% and up to about 0.25% after the completion of a second oxygen blow, then making said second oxygen blow to inject an amount of oxygen into the molten metal such that by the heat of its reaction with silicon the temperature of the molen metal is raised high enough to retain enough oxygen in the molten metal to remove excess carbon remaining in the molten metal when the latter is subjected to subatmospheric pressure.

5. The method as set forth in claim 4 in which the carbon content of the molten metal after being partially decarburized is from about 0.03% to 0.08% and the silicon content is from about 0.15% to 1.00%.

6. The method as set forth in claim 4 in which the carbon content of the metal after said second oxygen flow is no more than 0.03%.

7. The method as set forth in claim 4 when used in making an alloy having a final carbon content of up to about 0.03%, at least one of the elements selected from the group consisting of nickel, cobalt, and iron, and at least one additional alloying element.

8. The method as set forth in claim 4 when used in making a stainless alloy having a final carbon content of up to about 0.03%, at least one of the elements selected from the group consisting of nickel, cobalt, and iron, a final chromium content of about 10 to 25%, and at least one additional alloying element.

9. The method as set forth in claim 4 which includes adjusting the silicon content to the extent necessary to provide a silicon content of no less than 0.12% after the completion of the second oxygen blow.

References Cited

UNITED STATES PATENTS

| | | | |
|---|---|---|---|
| 2,502,259 | 3/1950 | Hulme | 75—60 |
| 3,336,132 | 8/1967 | McCoy | 75—60 |

WINSTON A. DOUGLAS, Primary Examiner

P. D. ROSENBERG, Assistant Examiner

U.S. Cl. X.R.

75—12, 49, 60

UNITED STATES PATENT OFFICE
CERTIFICATE OF CORRECTION

Patent No. 3,556,770          Dated January 19, 1971

Inventor(s) Carl B. Post, Ralph C. Leinbach & Michael D. Sulliv

It is certified that error appears in the above-identified patent and that said Letters Patent are hereby corrected as shown below:

Column 6, line 62, for "slug" read -- slag --.

Column 9, line 38, for "787,720" read -- 78,720 --.

Column 13, line 34, for "908,063" read -- 809,068 --.

Signed and sealed this 1st day of October 1974.

(SEAL)
Attest:

McCOY M. GIBSON JR.
Attesting Officer

C. MARSHALL DANN
Commissioner of Patents